(12) United States Patent
Rambo et al.

(10) Patent No.: US 12,392,295 B2
(45) Date of Patent: Aug. 19, 2025

(54) AIRCRAFT PROPULSION SYSTEM

(71) Applicant: General Electric Company, Schenectady, NY (US)

(72) Inventors: Jeffrey D. Rambo, Mason, OH (US); Brandon W. Miller, Middletown, OH (US); Scott G. Edens, Milford, OH (US)

(73) Assignee: General Electric Company, Evendale, OH (US)

( * ) Notice: Subject to any disclaimer, the term of this patent is extended or adjusted under 35 U.S.C. 154(b) by 54 days.

(21) Appl. No.: 18/152,903

(22) Filed: Jan. 11, 2023

(65) Prior Publication Data

US 2024/0229726 A1    Jul. 11, 2024

(51) Int. Cl.
  *F02C 9/00*   (2006.01)
  *F02C 3/04*   (2006.01)
  *F02C 7/057*  (2006.01)
  *F02C 9/18*   (2006.01)

(52) U.S. Cl.
  CPC .......... *F02C 9/18* (2013.01); *F02C 3/04* (2013.01); *F02C 7/057* (2013.01); *F05D 2220/10* (2013.01); *F05D 2220/3217* (2013.01); *F05D 2220/323* (2013.01)

(58) Field of Classification Search
  None
  See application file for complete search history.

(56) References Cited

U.S. PATENT DOCUMENTS

| | | | |
|---|---|---|---|
| 2,969,939 A | 1/1961 | Sulkin et al. | |
| 3,067,578 A | 12/1962 | Goodall et al. | |
| 3,176,462 A * | 4/1965 | Eckert | F02K 7/16 60/262 |
| 4,660,376 A | 4/1987 | Johnson | |
| 10,794,282 B2 | 10/2020 | Dierksmeier et al. | |
| 10,934,942 B2 | 3/2021 | Dierksmeier et al. | |
| 11,242,798 B2 | 2/2022 | Haynes et al. | |
| 11,313,276 B2 | 4/2022 | Emmanouil et al. | |
| 2013/0104560 A1 * | 5/2013 | Kupratis | F02C 9/20 60/772 |
| 2016/0040605 A1 * | 2/2016 | Howarth | F02C 3/04 60/785 |
| 2017/0096945 A1 * | 4/2017 | Mueller | F01D 5/088 |

(Continued)

FOREIGN PATENT DOCUMENTS

| FR | 3127269 A1 | 3/2023 |
|---|---|---|
| FR | 3130896 A1 | 6/2023 |

(Continued)

OTHER PUBLICATIONS

Zalud, Gears Put a New Spin on Turbofan Performance, 1998 (Year: 1998).*

*Primary Examiner* — Edwin Kang
(74) *Attorney, Agent, or Firm* — Carter, DeLuca & Farrell LLP

(57) ABSTRACT

A propulsion system includes (a) a turbine engine including a compressor section, a combustor, and a turbine section, (b) a ramjet engine, and (c) an inlet section including a turbine engine inlet portion and a ramjet inlet portion, the inlet section providing an inlet airflow to the turbine engine and to the ramjet engine. The turbine engine inlet portion includes an expansion turbine arranged upstream of the compressor section.

15 Claims, 9 Drawing Sheets

(56) References Cited

U.S. PATENT DOCUMENTS

| | | | | |
|---|---|---|---|---|
| 2017/0191500 A1* | 7/2017 | Lobocki | .................... | F02C 7/04 |
| 2017/0234240 A1* | 8/2017 | Dierksmeier | ........... | F02C 3/107 |
| | | | | 60/782 |
| 2017/0314471 A1* | 11/2017 | Sennoun | ................. | F28D 15/02 |
| 2018/0017017 A1* | 1/2018 | Tomlinson | ................ | F02K 7/16 |
| 2020/0340400 A1 | 10/2020 | Bryan | | |

FOREIGN PATENT DOCUMENTS

| | | |
|---|---|---|
| FR | 3130897 A1 | 6/2023 |
| FR | 3133367 A1 | 9/2023 |
| FR | 3133368 A1 | 9/2023 |
| GB | 2601367 A | 6/2022 |

\* cited by examiner

AIRCRAFT PROPULSION SYSTEM

TECHNICAL FIELD

The present disclosure relates to an aircraft propulsion system.

BACKGROUND

An aircraft may include a propulsion system, such as a gas turbine engine, a ramjet engine, or a scramjet engine. Aircraft that may be designed for a high Mach number may include a combined propulsion system that includes, for example, a gas turbine engine for low Mach number operations and a ramjet engine for high Mach number operations. Such a combined propulsion system may cut-off airflow to the gas turbine engine, and generally shutdown the gas turbine engine once the ramjet engine is ignited and operational. The gas turbine engine may be made operational once again when the airspeed decreases to an acceptable level for operation of the gas turbine engine.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

The terms "upstream" and "downstream" refer to the relative direction with respect to fluid flow in a fluid pathway. For example, "upstream" refers to the direction from which the fluid flows, and "downstream" refers to the direction to which the fluid flows.

An aircraft may include a propulsion system, such as a gas turbine engine, a ramjet engine, or a scramjet engine. Aircraft that may be designed for a high Mach number may include a combined propulsion system that includes, for example, a gas turbine engine for low Mach number operations and a ramjet engine for high Mach number operations. Such a combined propulsion system may cut-off airflow to the gas turbine engine, and generally shutdown the gas turbine engine once the ramjet engine is ignited and operational. The gas turbine engine may be made operational once again when the airspeed decreases to an acceptable level for operation of the gas turbine engine.

The present disclosure provides a propulsion system that includes both a turbine engine and a ramjet jet engine, with an expansion turbine being implemented with the turbine engine at high speeds so that the turbine engine can be made operational at the higher speed. More particularly, the propulsion system according to the present disclosure provides for normal operation of the turbine engine during a first operating state (e.g., a low speed operating state of up to Mach 2.5, for example). Once a predetermined flight speed is reached, the propulsion system provides for a transition to operating both the turbine engine and the ramjet engine at a second operating state (i.e., a high speed operating state of greater than Mach 2.5). To allow for operation of the turbine engine at the higher speed, the inlet airflow is conditioned by an expansion turbine upstream of the turbine engine so as to cool the inlet airflow that is then provided to the turbine engine. As a result, the turbine engine can continue to operate at the higher speeds, along with the ramjet engine, thereby providing additional thrust.

Figure 1:
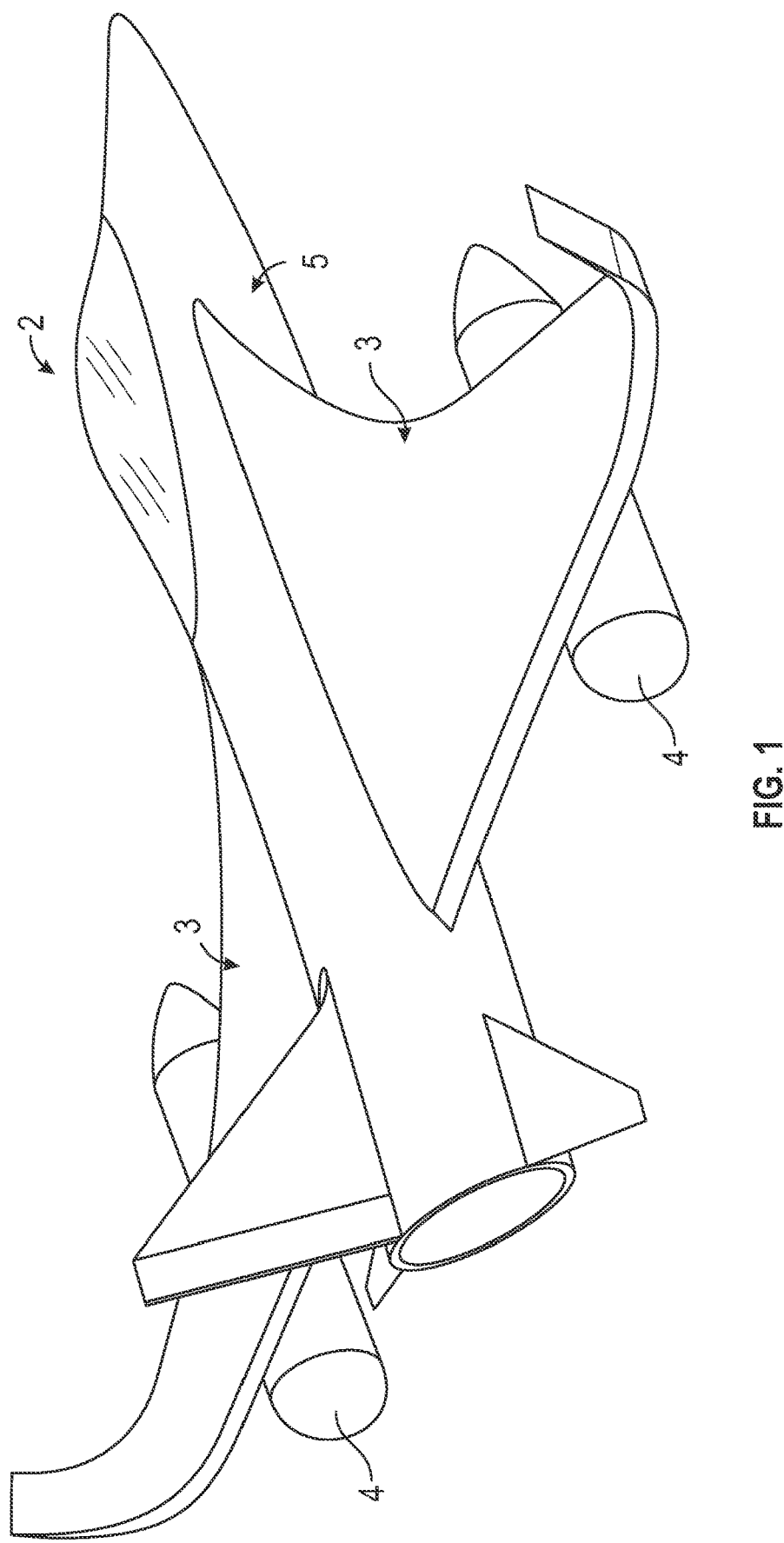
FIG. 1 is a top rear perspective view of an exemplary aircraft in which the propulsion system of the present disclosure may be implemented, according to an aspect of the present disclosure.

Referring now to the drawings, FIG. 1 is a perspective top rear view of an exemplary aircraft 2 (which may also be referred to as a flight vehicle) in which the propulsion system of the present disclosure may be implemented, according to an aspect of the present disclosure. The aircraft 2 of FIG. 1 may be designed for supersonic flight operations, or may be designed for hypersonic flight operations. As shown in FIG. 1, the aircraft 2 includes at least one propulsion system 4. In FIG. 1, two propulsion systems 4 are shown as being implemented in the aircraft 2, but fewer than two, or more than two, propulsion systems 4 may be implemented instead. In addition, FIG. 1 depicts the propulsion system 4 as generally being attached to an underside of a wing 3 of the aircraft 2, but the propulsion system 4 may be embedded within the wing 3 instead, or may be embedded within a fuselage 5 of the aircraft 2.

Figure 2:
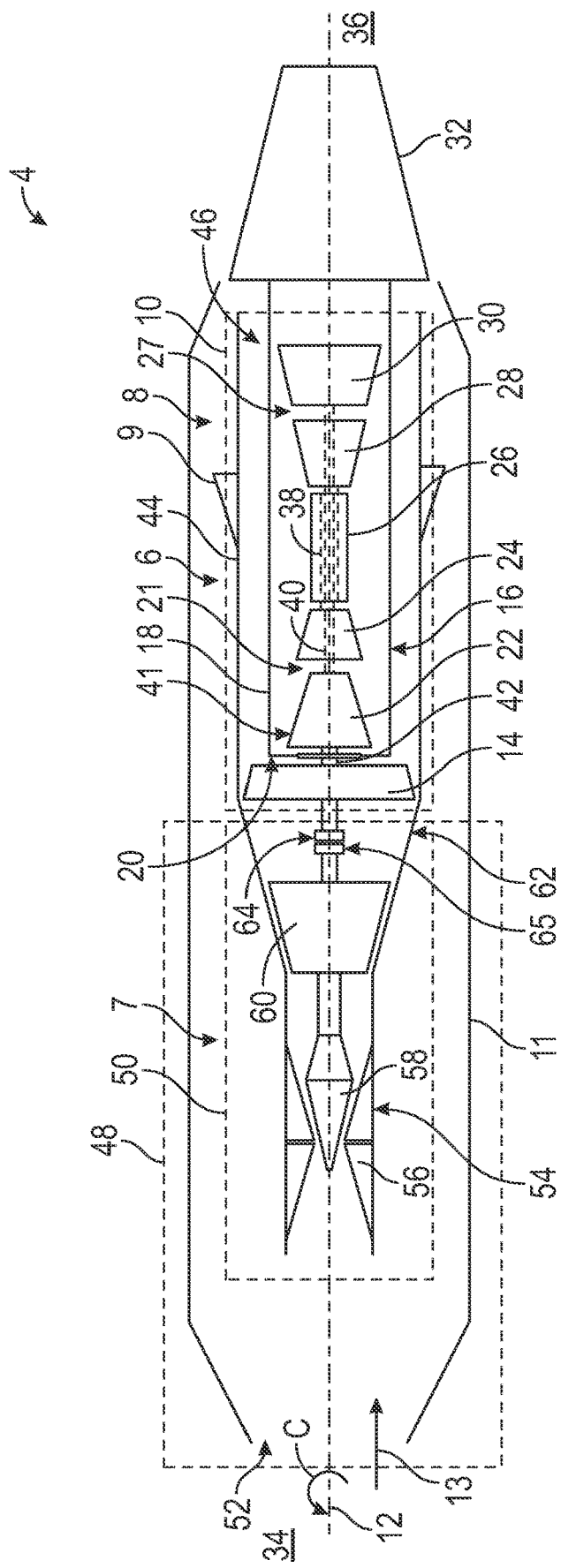
FIG. 2 is a schematic block layout of an exemplary propulsion system, according to an aspect of the present disclosure.

FIG. 2 is a schematic block layout of an exemplary propulsion system 4, according to an aspect of the present disclosure. The propulsion system 4 may include a ramjet engine 6 and a turbine engine 10. The turbine engine 10 may be, for example, a turbofan engine or a turbojet engine, as but a few examples. As shown in FIG. 1, propulsion system 4 has a longitudinal centerline axis 12 that extends therethrough from an upstream end 34 of the propulsion system 4 to a downstream end 36 of the propulsion system 4 for reference purposes. The longitudinal centerline axis 12 may also represent a longitudinal centerline axis of the ramjet engine 6 and/or a longitudinal centerline axis of the turbine engine 10. The ramjet engine 6 may generally be a dual mode ramjet engine that can operate as either a ramjet engine or as a scramjet engine, and is defined between an outer casing 11 of the propulsion system 4 and the turbine engine 10. The ramjet engine 6 may extend circumferentially in a circumferential direction C about the longitudinal centerline axis 12, and the ramjet engine 6 may include a ramjet inlet portion 7 and a ramjet combustor 8. Thus, the ramjet engine 6 may be arranged in parallel with the turbine engine 10. However, the ramjet engine 6 need not be arranged in parallel with the turbine engine 10, need not be arranged circumferentially about the turbine engine 10, and may be a separate engine defined by another shape (e.g., a square or rectangular shape). In a case when the ramjet engine 6 is arranged in parallel with the turbine engine 10, the ramjet engine 6 may extend along at least a portion of the length of the turbine engine 10 parallel with the turbine engine 10. For example, the ramjet engine 6 may be rectangular shaped arranged either above or below the turbine engine 10 in an over/under configuration of the propulsion system 4. As will be described in more detail below, a portion of an inlet airflow 13 to the propulsion system 4 may pass through the ramjet inlet portion 7 to the ramjet combustor 8, where fuel may be injected by one or more ramjet fuel injectors 9 (two shown in FIG. 1) into the ramjet combustor 8 to mix with the inlet airflow 13 and to be ignited and burned to provide ramjet propulsion.

In FIG. 2, the turbine engine 10 is depicted as constituting a turbofan engine and, therefore, the following description will focus on a turbofan engine being included within the propulsion system 4. The turbine engine 10 may include a fan assembly 14 and a core engine 16 disposed downstream from the fan assembly 14. The core engine 16 may generally include a core engine outer casing 18 that defines an annular inlet 20. The core engine outer casing 18 encases, in serial flow relationship, a compressor section 21 that includes a low pressure (LP) compressor 22 and a high pressure (HP) compressor 24, a combustor 26, a turbine section 27 that includes a high pressure (HP) turbine 28 and a low pressure (LP) turbine 30, and a jet exhaust nozzle section 32. The jet exhaust nozzle section 32 may be a shared nozzle that is shared between the turbine engine 10 and the ramjet engine 6. A high pressure (HP) shaft assembly 38 drivingly couples the HP turbine 28 to the HP compressor 24, and a low pressure (LP) shaft assembly 40 drivingly couples the LP turbine 30 to the LP compressor 22. Together, the low pressure compressor 22, the low pressure turbine 30, and the low pressure shaft assembly 40 may be referred to as a low pressure spool 41 that rotate together as one element. In a turbofan engine such as that shown in FIG. 2, the low pressure spool 41 may further be coupled to the fan assembly 14 via a fan shaft 42, with the fan assembly 14 being arranged upstream of the compressor section 21. While not shown in FIG. 2, a reduction gearbox may be implemented within the fan shaft 42 between the low pressure compressor 22 and the fan assembly 14 so as to function as a speed reducer between the low pressure spool 41 and the fan assembly 14. Thus, in normal operation of the turbine engine 10, the low pressure spool 41 drives the fan assembly 14. A fan casing 44 circumferentially surrounds the fan assembly 14 and/or at least a portion of the core engine 16 so as to define a bypass airflow passage 46 therebetween. As an alternative configuration, the fan assembly 14 and the low pressure compressor 22 may be one and the same such that, for example, the low pressure compressor 22 may be considered as a multi-stage fan (e.g., a three stage fan).

The propulsion system 4 is further seen to include an inlet section 48 that includes the ramjet inlet portion 7 and a turbine engine inlet portion 50. As will be described below, the inlet section 48 takes in the inlet airflow 13 at a propulsion system inlet 52 and provides the inlet airflow 13 to both the ramjet engine 6 and to the turbine engine 10. In the FIG. 2 aspect, the turbine engine inlet portion 50 is shown as including an airflow restriction mechanism 54. Here, the turbine engine inlet portion 50 may include a converging/diverging inlet 56, and the airflow restriction mechanism 54 may constitute a translating spike 58. The translating spike 58 can be actuated toward the upstream end 34 in a longitudinal direction with respect to the longitudinal centerline axis 12 (i.e., actuated in the forward direction) so as to engage with the converging/diverging inlet 56 to restrict airflow therethrough, or may be actuated toward the downstream end 36 (i.e., actuated in the aft direction) to disengage from the converging/diverging inlet 56 and to allow airflow therethrough. The turbine engine inlet portion 50 may further include an expansion turbine 60 and an intermediate inlet portion 62 arranged between the expansion turbine 60 and the annular inlet 20 to the core engine 16. The expansion turbine 60 may include a plurality of turbine rotors (i.e., stages) (not shown) that each include turbine blades (not shown) that, when airflow passes therethrough, causes the expansion turbine 60 to rotate. The expansion turbine 60 is arranged upstream of the fan assembly 14 (or upstream of the annular inlet 20 to the core engine 16 in the case when the turbine engine 10 is a turbojet engine that omits the fan assembly 14). The expansion turbine 60 may be coupled/decoupled to/from the fan assembly 14 via a coupling drive shaft mechanism 64 that is arranged to couple/decouple the fan assembly 14 and the expansion turbine 60 to/from each other. The coupling drive shaft mechanism 64 may include, for example, a clutch device 65 that can engage/disengage to couple/decouple the expansion turbine 60 and the fan assembly 14 to/from each other. As will be described in more detail below, in some operating conditions of the propulsion system 4, airflow provided through the airflow restriction mechanism 54 to the expansion turbine 60 into the intermediate inlet portion 62 is cooled via the expansion turbine 60, and the cooled airflow can then be provided to the fan assembly 14 and to the core engine 16. In addition, as will be described below, when the expansion turbine 60 is made operational to expand and to cool the airflow flowing therethrough, the coupling drive shaft mechanism 64 may be engaged so as to at least partially drive the low pressure spool 41, thereby offloading some of the load from the low pressure turbine 30 required to drive the low pressure spool 41.

Figure 3:
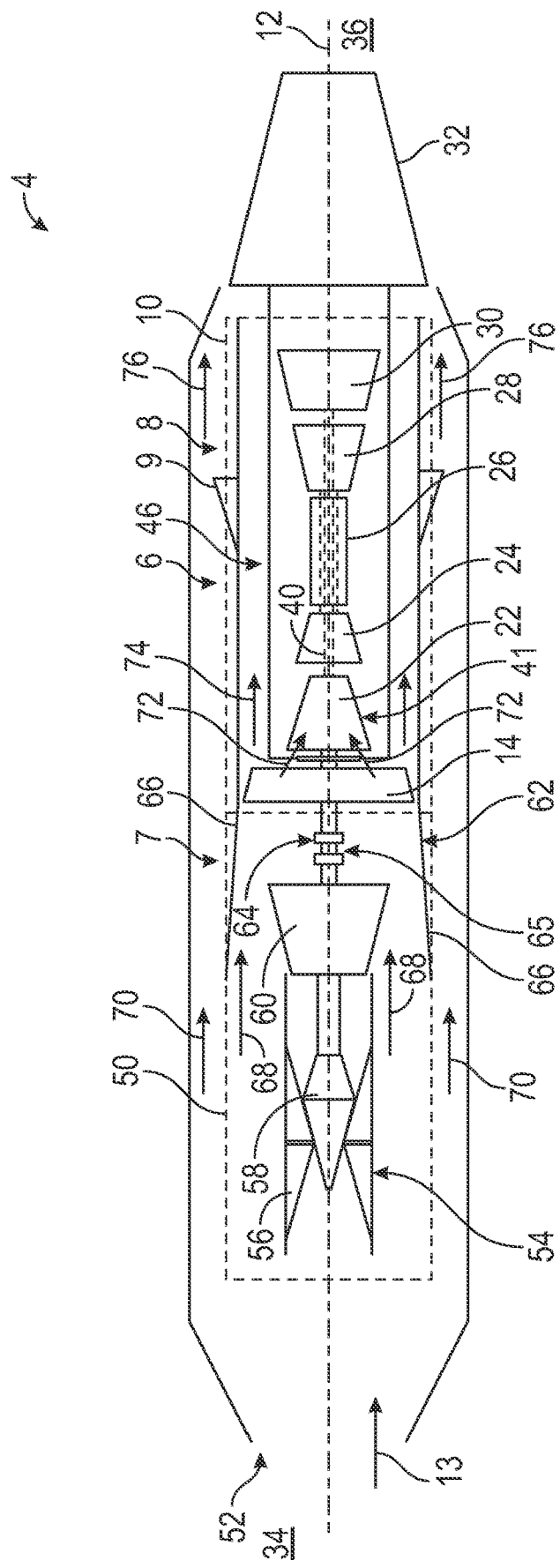
FIG. 3 is a schematic block layout of the propulsion system of FIG. 2 depicted in a first operating state, according to an aspect of the present disclosure.

FIG. 3 is a schematic block layout of the propulsion system of FIG. 2 depicted in a first operating state, according to an aspect of the present disclosure. In FIG. 3, elements that are the same as those of FIG. 2 are shown with the same reference numerals. In FIG. 3, the first operating state may be a low speed operating state, such as an operating state for a flight speed of the aircraft 2 of less than Mach 1, or for a flight speed of the aircraft 2 of up to Mach 2.5, for example. In FIG. 3, the intermediate inlet portion 62 may include a plurality of expansion turbine bypass doors 66 (two shown in FIG. 3) that can be actuated between an open state as shown in FIG. 3 to allow an inlet airflow 68 to bypass the expansion turbine 60 and to be provided directly to the fan assembly 14 of the turbine engine 10, or actuated to a closed state as shown in FIG. 2. In the first operating state, the airflow restriction mechanism 54 may be actuated to restrict the flow of air therethrough to the expansion turbine 60. For example, the translating spike 58 may be translated longitudinally toward the upstream end 34 of the propulsion system 4 so as to engage with the converging/diverging inlet 56, thereby restricting the flow of inlet airflow 13 from passing through the converging/diverging inlet 56 to the expansion turbine 60. In addition, as shown in FIG. 3, the coupling drive shaft mechanism 64 may be actuated to disengage the expansion turbine 60 from the fan assembly 14. For example, the clutch device 65 may be operated to disengage so as to decouple the expansion turbine 60 and the fan assembly 14 from each other by decoupling the coupling drive shaft mechanism 64. Thus, in the first operating state, the expansion turbine bypass doors 66 are actuated to the open state and the inlet airflow 13 is allowed to flow through the expansion turbine bypass doors 66 as the inlet airflow 68 to bypass the expansion turbine 60 and to flow to the fan assembly 14. The turbine engine 10 can, therefore, operate normally for the low speed operations utilizing the inlet airflow 68. On the other hand, another portion of the inlet airflow 13 may enter the ramjet inlet portion 7 as a ramjet inlet airflow 70. In the first operating state, the ramjet engine 6 may be idle and, therefore, the ramjet inlet airflow 70 may merely be a bypass airflow that flows through the ramjet combustor 8 without being mixed with fuel. Alternatively, once a predetermined Mach number has been reached (e.g., a Mach number greater than Mach 1, or a Mach number greater than Mach 2.0, or a Mach number greater than Mach 2.5, as some examples) during the first operating state, the ramjet engine 6 may become operational so as to inject fuel into the ramjet combustor 8 by the ramjet fuel injector 9 and to ignite the fuel/air mixture within the ramjet combustor 8 to generate ramjet combustion products 76.

In normal operation of the turbine engine 10, a first portion of the inlet airflow 68, shown schematically as inlet airflow 72, passes through the fan assembly 14 and into the annular inlet 20 of the core engine 16. The low pressure compressor 22 and the high pressure compressor 24 compress the inlet airflow 72 to provide compressed air to the combustor 26. In the combustor 26, fuel is injected into the compressed air to generate a fuel/air mixture that is then ignited and burned to generate combustion gases. The combustion gases pass through the high pressure turbine 28, thereby supporting operation of the high pressure compressor 22, and pass through the low pressure turbine 30, thereby supporting operation of the low pressure spool 41. The combustion gases then pass through the jet exhaust nozzle section 32 to provide thrust. A second portion of the inlet airflow 68, shown schematically as an inlet airflow 74, passes through the fan assembly 14 and flows through the bypass airflow passage 46 to provide thrust.

Figure 4:
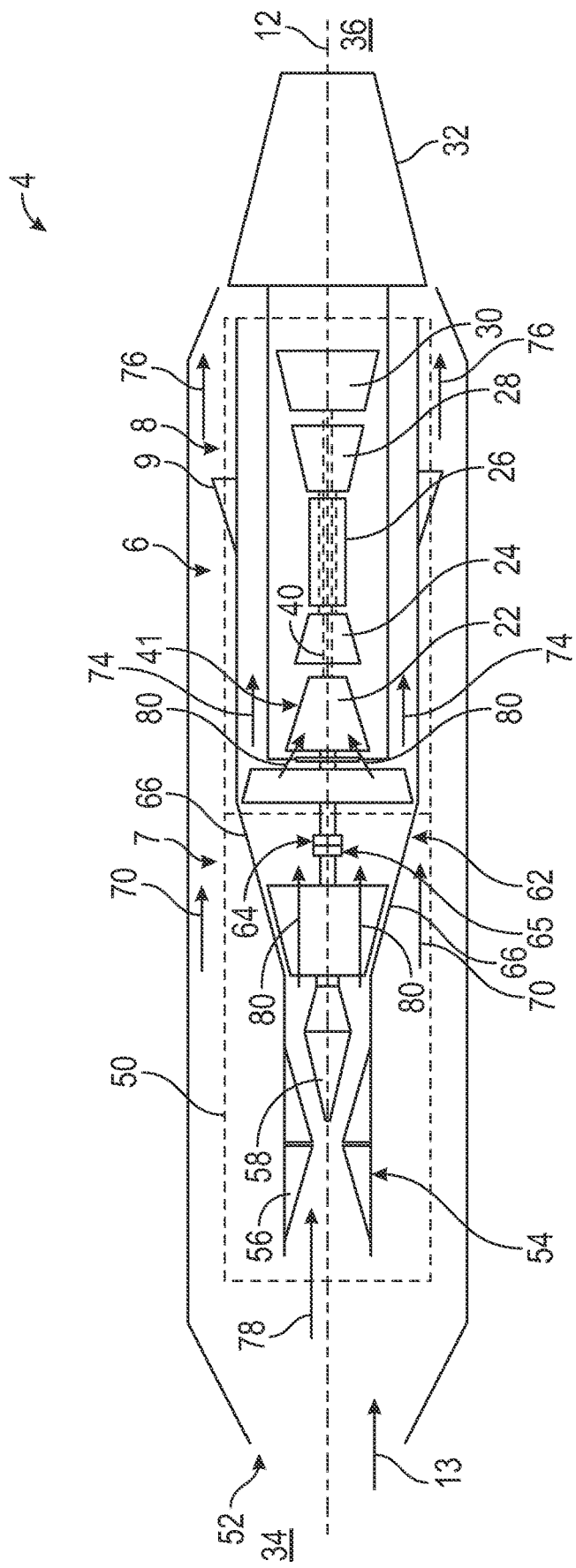
FIG. 4 is a schematic block layout of the propulsion system of FIG. 3, but depicted in a second operating state, according to an aspect of the present disclosure.

FIG. 4 is a schematic block layout of the propulsion system of FIG. 2 depicted in a second operating state, according to an aspect of the present disclosure. In FIG. 4, elements that are the same as those of FIG. 2 are shown with the same reference numerals. In FIG. 4, the second operating state may be a high speed operating state, such as an operating state for a flight speed of the aircraft 2 of greater than Mach 2.5, or for a flight speed of the aircraft 2 of up to Mach 5.0, for example. In FIG. 4, in the second operating state, the plurality of expansion turbine bypass doors 66 are actuated to a closed state, and the airflow restriction mechanism 54 may be actuated to allow an inlet airflow 78 to pass therethrough to the expansion turbine 60. For example, the translating spike 58 may be translated longitudinally toward the downstream end 36 of the propulsion system 4 so as to disengage from the converging/diverging inlet 56, thereby opening the converging/diverging inlet 56 to allow the flow of inlet airflow 78 to pass through the converging/diverging inlet 56 to the expansion turbine 60. In addition, as shown in FIG. 4, the coupling drive shaft mechanism 64 may be actuated to couple the expansion turbine 60 with the fan assembly 14. For example, the clutch device 65 may be operated to engage so as to mechanically couple the expansion turbine 60 and the fan assembly 14 to each other by coupling the coupling drive shaft mechanism 64. Thus, in the second operating state, the expansion turbine bypass doors 66 are actuated to the closed state and the inlet airflow 78 is allowed to flow through the converging/diverging inlet 56 to the expansion turbine 60.

Due to the high Mach number of the aircraft 2 in the second operating state, the inlet airflow 13 may be compressed at the propulsion system inlet 52 and/or the inlet airflow 78 may be compressed at the converging/diverging inlet 56 so as to reduce the inlet airflow from being a supersonic airflow to a subsonic airflow. The compression of the inlet airflow 13 and/or the compression of the inlet airflow 78 generally results in an increase in the temperature of the airflow, and may increase the temperature above an acceptable temperature for inlet air provided to the turbine engine 10. Thus, in the FIG. 4 aspect, the high temperature inlet airflow 78 passes through the expansion turbine 60 and is conditioned by the expansion turbine 60 to provide a reduced temperature airflow 80 to the turbine engine 10. The turbine engine 10 can, therefore, operate (or windmill) utilizing the reduced temperature airflow 80 that is provided to the fan assembly 14.

In addition, in the second operating state, with the clutch device 65 being engaged so as to couple the expansion turbine 60 with the fan assembly 14, the expansion turbine 60 can provide a driving force to the fan assembly 14, and, by virtue of the fan assembly 14 being coupled to the low pressure spool 41, provides a driving force to the low pressure spool 41. As a result, the expansion turbine 60 can provide additional power to the low pressure spool 41, or can offload some of the work required by the low pressure turbine 30, thereby reducing fuel consumption of the turbine engine 10. The turbine engine 10 can otherwise operate normally as described above.

In the ramjet engine 6, in the second operating state, the ramjet inlet airflow 70 flows through the ramjet inlet portion 7 to the ramjet combustor 8. In the second operating state, the ramjet engine 6 is operational so as to inject fuel into the ramjet combustor 8 by the ramjet fuel injector 9 and to ignite the fuel/air mixture within the ramjet combustor 8 to generate ramjet combustion products 76, thereby providing ramjet thrust to the propulsion system, along with the turbine engine thrust. Thus, in the second operating state, the propulsion system 4 provides an improved transition from the first (low speed) operating state (e.g., up to Mach number 2.5) and the second (high speed) operating state (e.g., Mach number between 2.5 and 5.0) by permitting the turbine engine 10 to be operated at higher speeds of the aircraft 2. In addition, the expansion turbine 60 can offload some of the work required by the low pressure spool 41, thereby providing lower fuel consumption and better efficiency of the propulsion system.

Figure 5:
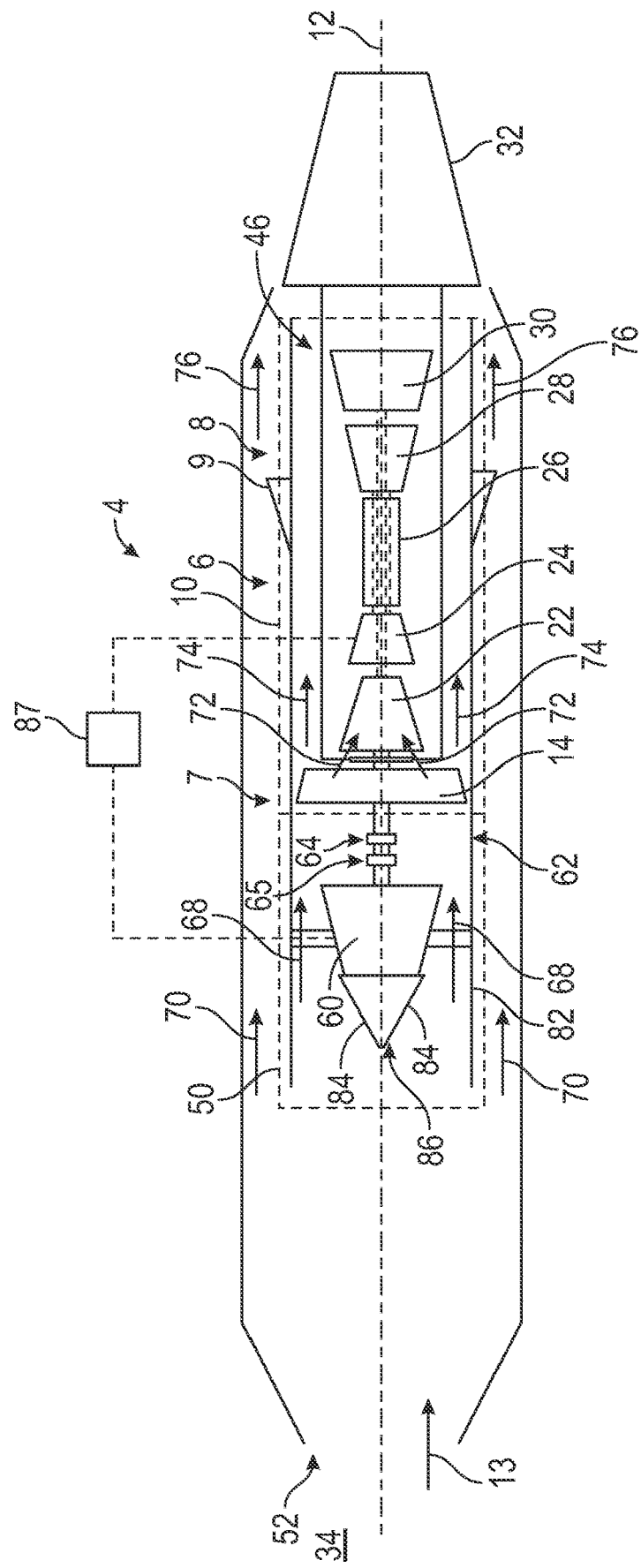
FIG. 5 is a schematic block layout of a propulsion system in a first operating state, according to another aspect of the present disclosure.

FIG. 5 is a schematic block layout of an exemplary propulsion system 4 in the first operating state, according to another aspect of the present disclosure. The FIG. 5 aspect, similar to the FIG. 3 aspect, depicts the propulsion system 4 in the first operating state, and elements that are the same as those of FIG. 3 are shown with the same reference numerals.

In the FIG. 5 aspect, however, an alternate aspect of the turbine engine inlet portion 50 is provided. The FIG. 5 aspect, in contrast with the FIG. 3 aspect, omits the translating spike 58 and the converging/diverging inlet 56. Instead, in the FIG. 5 aspect, the turbine engine inlet portion 50 includes an annular inlet casing 82 and a plurality of airflow inlet doors 84 (two shown in FIG. 5) that are arranged to isolate the expansion turbine 60 from the inlet airflow 13. The annular inlet casing 82 may extend circumferentially about the longitudinal centerline axis 12. The plurality of airflow inlet doors 84 are shown in FIG. 5 in a closed position (i.e., closed with respect to the inlet airflow 13 being restricted from flowing to the expansion turbine 60). Thus, the plurality of airflow inlet doors 84 may be seen to correspond to an airflow restriction mechanism 86 that restricts the inlet airflow 13 from flowing through the expansion turbine 60. The plurality of airflow inlet doors 84 being in the closed position, therefore, corresponds to an open state of the turbine engine inlet portion 50 with regard to allowing the inlet airflow 68 to bypass the expansion turbine 60 and to flow to the fan assembly 14.

As with the FIG. 3 aspect, the clutch device 65 is disengaged so as to decouple the coupling drive shaft mechanism 64 and, therefore, to decouple the expansion turbine 60 from the fan assembly 14. Accordingly, in the first operating state of the FIG. 5 aspect, the inlet airflow 68 is provided to the fan assembly 14 and the turbine engine 10 operates normally in the same manner discussed above for FIG. 3. The FIG. 5 aspect may also include a thermal management system 87 that provides a cooling airflow from, for example, the compressor section 21 to the expansion turbine 60. The thermal management system 87 will be described in more detail below.

Additionally, in the same manner described above for the FIG. 3 aspect, the ramjet inlet airflow 70 is provided to the ramjet inlet portion 7, and the ramjet engine 6 may either be idle, with the ramjet inlet airflow 70 merely being a bypass airflow through the ramjet combustor 8, or, at the predetermined Mach number, the ramjet engine 6 may be made operational as described above.

Figure 6:
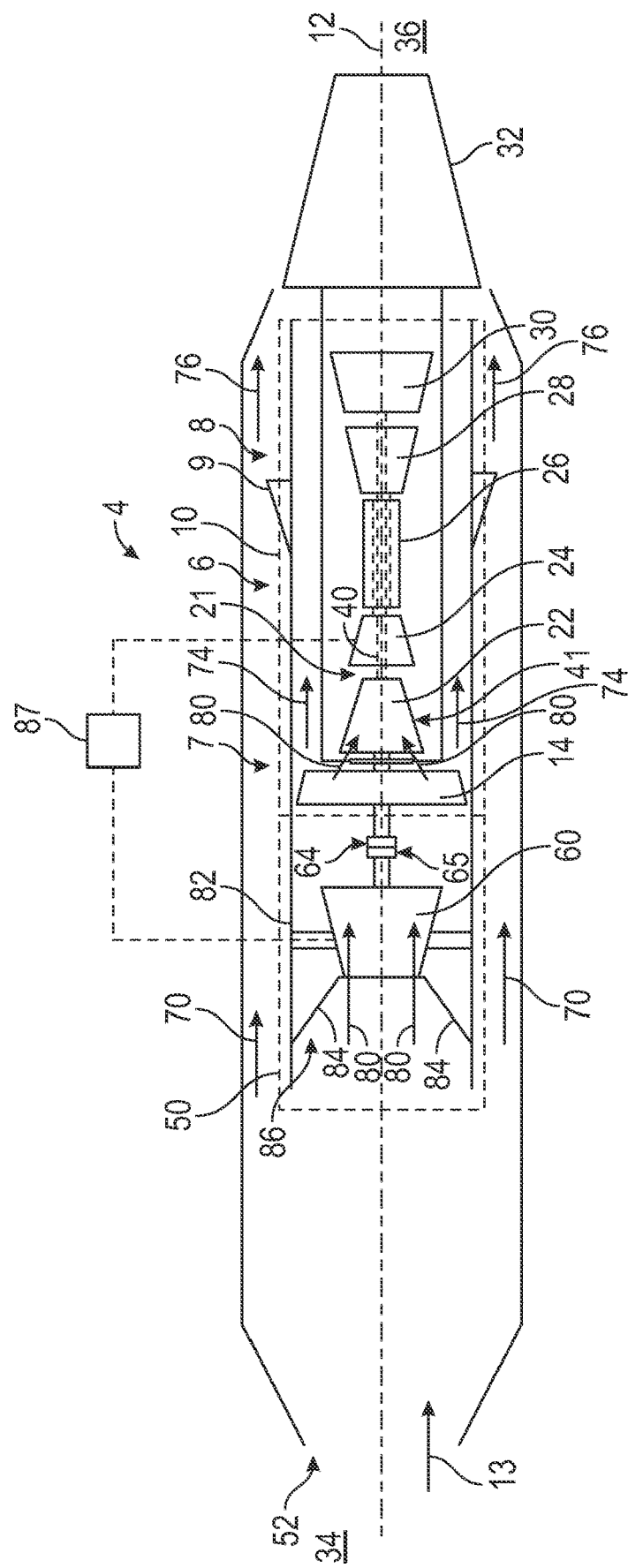
FIG. 6 is a schematic block layout of the propulsion system of FIG. 5, but depicted in the second operating state, according to another aspect of the present disclosure.

FIG. 6 is a schematic block layout of the propulsion system of FIG. 5, but depicted in a second operating state, according to another aspect of the present disclosure. In FIG. 6, elements that are the same as those of the FIG. 5 aspect, are shown with the same reference numerals. The second operating state of FIG. 6 may be the same as that described above for FIG. 4. In the second operating state, the plurality of airflow inlet doors 84 are actuated to an open state (i.e., open with respect to the inlet airflow 13 being permitted to flow to the expansion turbine 60). Thus, the plurality of airflow inlet doors 84 may be seen to correspond to an airflow restriction mechanism 86 that is actuated to permit the inlet airflow 13 to flow through the expansion turbine 60. The plurality of airflow inlet doors 84 being actuated to be in the open position, therefore, corresponds to a closed state of the turbine engine inlet portion 50 with regard to preventing the inlet airflow 68 from bypassing the expansion turbine 60 and flowing directly to the fan assembly 14. Rather, similar to the FIG. 4 aspect, the inlet airflow 13 is permitted to flow through the expansion turbine 60, whereby the inlet airflow 13 is expanded and cooled to generate the reduced temperature airflow 80. In addition, the thermal management system 87 may provide additional cooling air to the expansion turbine 60 so as to provide even more cooling to the reduced temperature airflow 80. In this regard, while the thermal management system 87 is shown schematically in FIG. 6, the thermal management system 87 may include airflow ducting (not shown) that is connected to a compressor bleed valve (not shown) so as to provide bleed air from the compressor section 21 to the expansion turbine 60 for additional cooling of the reduced temperature airflow 80.

In the same manner as described above for FIG. 4, the reduced temperature airflow 80 is then utilized by the turbine engine 10 to operate the turbine engine 10 as described above for FIG. 4. In addition, as shown in FIG. 5, and in the same manner as described above for FIG. 4, the coupling drive shaft mechanism 64 may be actuated to couple the expansion turbine 60 with the fan assembly 14. For example, the clutch device 65 may be operated to engage so as to couple the expansion turbine 60 and the fan assembly 14 to each other by coupling the coupling drive shaft mechanism 64. Thus, in the same manner described above for FIG. 4, the expansion turbine 60 may provide a driving force to the fan assembly 14, and to the low pressure spool 41.

Figure 7:
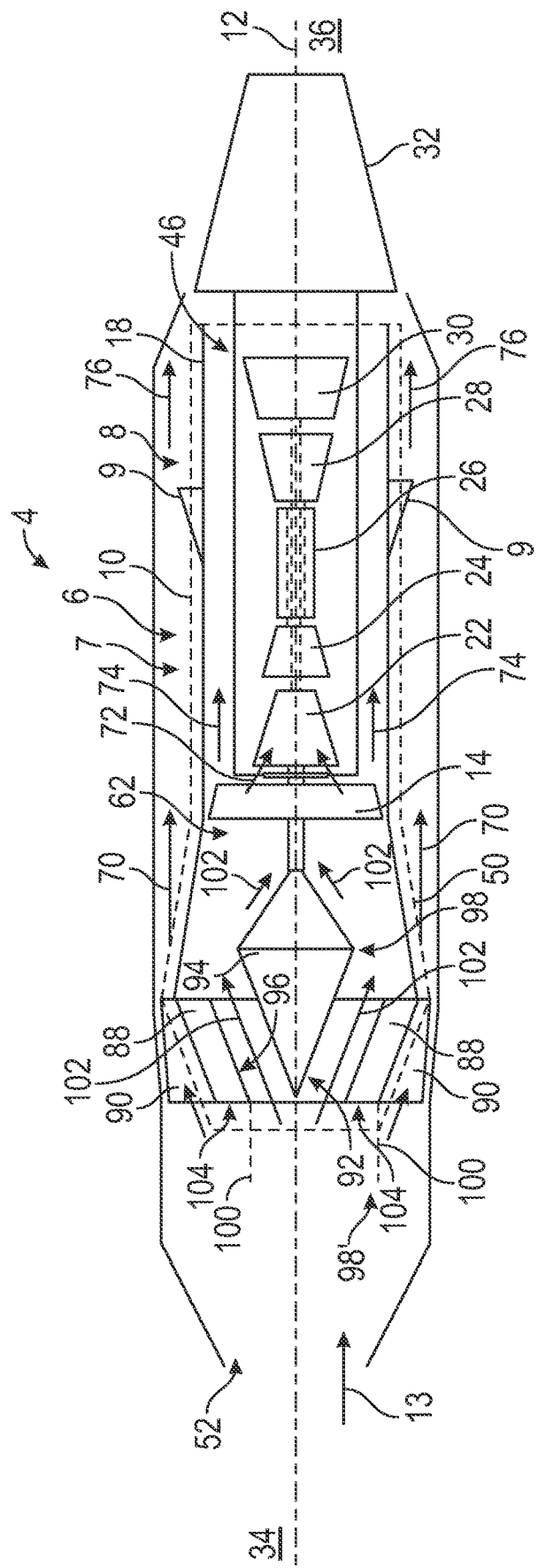
FIG. 7 is a schematic block layout of a propulsion system in a first operating state, according to yet another aspect of the present disclosure.

FIG. 7 is a schematic block layout of an exemplary propulsion system 4 in the first operating state, according to yet another aspect of the present disclosure. The FIG. 7 aspect, as in the FIG. 3 aspect and the FIG. 5 aspect, depicts the propulsion system 4 in the first operating state, and elements that are the same as those of FIG. 3 and FIG. 5 are shown with the same reference numerals in FIG. 7. In the FIG. 7 aspect, however, another alternate aspect of the turbine engine inlet portion 50 is provided. More particularly, the turbine engine inlet portion 50 includes an expansion turbine 88 that also includes a tip fan 90 arranged radially outward of the expansion turbine 88. The tip fan 90 may constitute a plurality of tip fan blades (not shown) extending radially outward from the expansion turbine 88, where a tip fan shroud (not shown) may separate the expansion turbine blades from the tip fan blades. Thus, in operation, when the airflow passes through the turbine blades of the expansion turbine 88 causing the expansion turbine 88 to rotate, the tip fan blades are also caused to rotate to increase the pressure or to drive additional mass to the airflow passing therethrough the ramjet inlet 7. The expansion turbine 88 also includes a central inlet opening 92 that may be centrally located within the expansion turbine 88. The central inlet opening 92 may generally be smaller than the sum of the expansion turbine and tip fan flow areas such that, the inner flow path may be sized to deliver a proper mass flow rate to the gas turbine engine 10 and additional airflow would begin to flow through the expansion turbine 88 as the aircraft speed increases. In addition, the translating spike 94 provides an aerodynamic throat that meters the airflow to the gas turbine intermediate inlet section 62 and not necessarily at the inlet plane to the central inlet opening 92 of the expansion turbine 88. In addition, the turbine engine inlet portion 50 of the FIG. 7 aspect is shown to include a translating spike 94, which may be similar to the translating spike 58 (FIGS. 2 to 4). The translating spike 94 may be actuated longitudinally toward the upstream end 34 to engage with an inner surface 96 of the central inlet opening 92 so as to restrict airflow therethrough, thus functioning as an airflow restriction mechanism 98. The translating spike 94 may also be actuated longitudinally toward to the downstream end 36 so as to disengage from the inner surface 96 of the central inlet opening 92, thereby permitting airflow to flow therethrough. Alternatively, rather than including the translating spike 94, a plurality of airflow inlet doors 100 (shown with dashed lines) may be included at the central inlet opening 92 to function as an airflow restriction mechanism 98', where the plurality of airflow inlet doors 100 may be similar to the plurality of airflow inlet doors 84 (FIGS. 5 and 6).

The translating spike 94 is shown in FIG. 7 as being translated toward the downstream end 36 so as to permit the inlet airflow 13 to pass through the central inlet opening 92 as an inlet airflow 102 to the intermediate inlet portion 62 and to the fan assembly 14. Similarly, in the case when the airflow inlet doors 100 are implemented rather than the translating spike 94, the airflow inlet doors 100 may be actuated to be in an open position as shown in FIG. 7 to permit the inlet airflow 13 to flow through the central inlet opening 92 as the inlet airflow 102. The expansion turbine 88 may include a plurality of turbine flow control doors 104 at an upstream side of the expansion turbine 88. The turbine flow control doors 104 may be circumferentially actuated doors that can be actuated to either be in an open position so as to allow the inlet airflow 13 to flow through the expansion turbine 88, or may be actuated to be in a closed position so as to restrict the inlet airflow 13 from flowing through the expansion turbine 88. Alternatively, the turbine flow control doors 104 may be circumferentially extending, radially overlapping, louvers that can be actuated to an open position and to a closed position. Additionally, the turbine flow control doors 104 may be hinged flaps or translating plates, for example. In the first operating state of FIG. 7, the turbine flow control doors 104 are actuated to the closed position so as to restrict the flow of inlet airflow 13 from flowing through the expansion turbine 88. In the first operating state, since the inlet airflow 13 is restricted from flowing through the expansion turbine 88, but the inlet airflow 13 is permitted to flow through the tip fan 90 and into the ramjet inlet 7 as the ramjet inlet airflow 70, the airflow through the tip fan 90 may cause the tip fan 90 to rotate, and by virtue of its connection thereto, the expansion turbine 88, to rotate. The rotation of the tip fan 90 and the expansion turbine 88 may be acceptable in this case, or, alternatively, a braking mechanism could be implemented to prevent both the tip fan 90 and the expansion turbine 88 from rotating during the first operating state. Again, in the first operating state of FIG. 7, the turbine engine 10 is operated normally as described above utilizing the inlet airflow 102, and the ramjet engine 6 may be idle, or may be made operational at the higher end of the low speed operations (i.e., greater than Mach 1.0, or greater than Mach 2.0, or greater than Mach 2.5, as a few examples). As a result, the propulsion system 4 can provide for normal operations at lower speeds using the turbine engine 10, and possibly, the ramjet engine 6.

Figure 8:
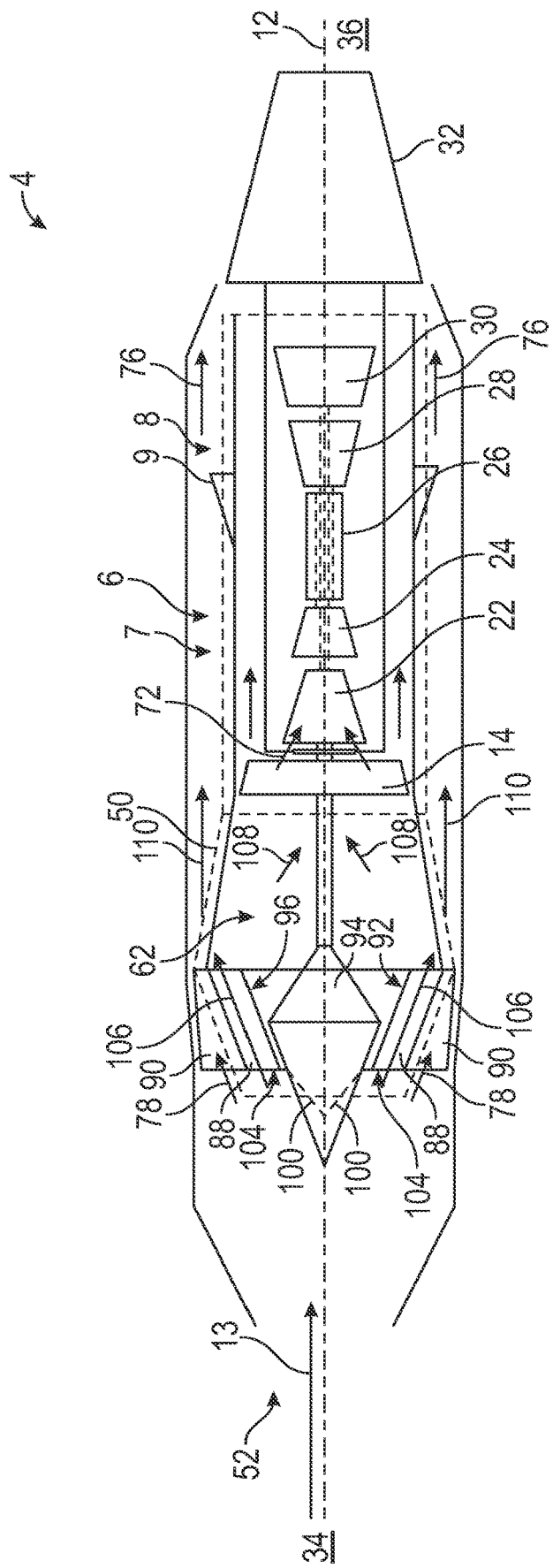
FIG. 8 is a schematic block layout of the propulsion system of FIG. 7, but depicted in the second operating state, according to another aspect of the present disclosure.

FIG. 8 is a schematic block layout of the propulsion system of FIG. 7, but depicted in a second operating state, according to another aspect of the present disclosure. In FIG. 8, elements that are the same as those of FIG. 7 are shown with the same reference numerals. The second operating state of FIG. 8 may be the same as that described above for FIG. 4 and for FIG. 6. In the second operating state, the translating spike 94 is translated toward the upstream end 34 so as to engage with the inner surface 96 of the central inlet opening 92, thereby restricting the flow of the inlet airflow 78 from flowing through the central inlet opening 92. Similarly, in the case when the airflow inlet doors 100 are implemented instead of the translating spike 94, the airflow inlet doors 100 may be actuated to be in a closed position as shown in FIG. 8, thereby restricting the inlet airflow 13 from flowing through the central inlet opening 92. In addition, the turbine flow control doors 104 may be actuated to an open state so as to permit the inlet airflow 78 to flow through the expansion turbine 88 as an expansion turbine inlet airflow 106. In the second operating state (i.e., the high speed operating state of greater than Mach 2.5, for example), the expansion turbine inlet airflow 106 may be at a higher temperature than a normal operating temperature of inlet air to be provided to the turbine engine 10. Thus, the expansion turbine inlet airflow 106 is cooled by the expansion turbine 88 to generate a reduced temperature inlet airflow 108 within the intermediate inlet portion 62. The reduced temperature inlet airflow 108 is then provided to the fan assembly 14 for operation of the turbine engine 10 as was described above.

In the second operating state of the ramjet engine 6, the inlet airflow 78 is provided to the tip fan 90, where it is boosted via the tip fan 90 to generate a boosted ramjet inlet airflow 110 that is provided to the ramjet inlet portion 7. The boosted ramjet inlet airflow 110 is then provided to the ramjet combustor 8, where fuel is injected into the boosted ramjet inlet airflow 110 to generate a fuel/air mixture that is then ignited and burned in the ramjet combustor 8, thereby producing ramjet combustion products 76 that are exhausted through the jet exhaust nozzle section 32 to generate ramjet thrust.

Figure 9:
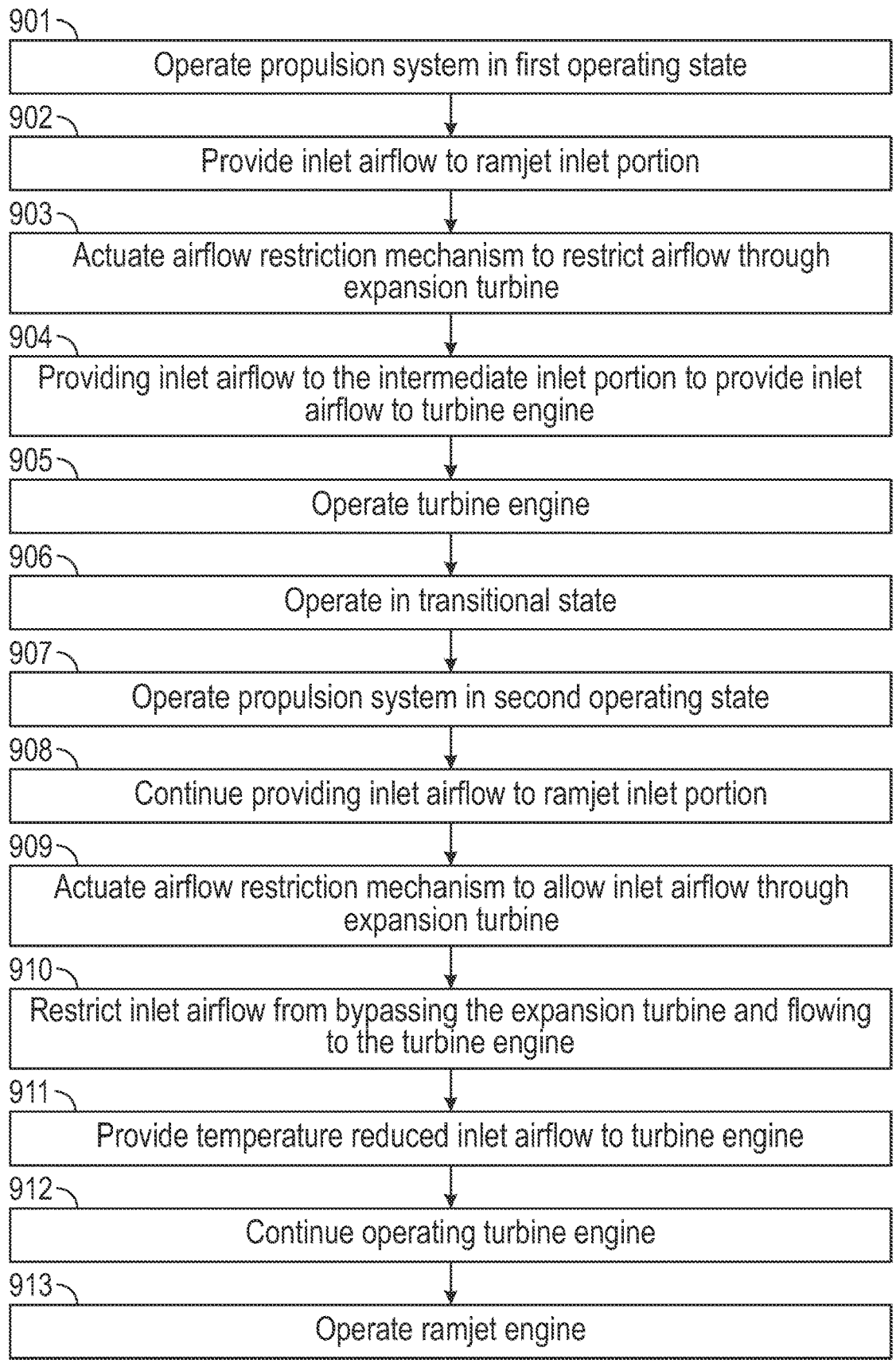
FIG. 9 is a flow chart of steps for a method of operating a propulsion system, according to an aspect of the present disclosure.

FIG. 9 is a flowchart of process steps of a method of operating the propulsion system 4, according to an aspect of the present disclosure. The method of FIG. 9 may be implemented in any one of the foregoing aspects of the propulsion system 4 shown and described with regard to FIGS. 1 to 8. In the method of operating the propulsion system 4, in step 901, the propulsion system 4 is operated in a first operating state. As was discussed above, the first operating state may be a low speed operating state, such as an operating state in which the aircraft 2 is operating up to an airspeed of Mach 2.5. In the first operating state, in step 902, an inlet airflow 13 is provided through the ramjet inlet portion 7 so as to provide a ramjet inlet airflow 70 through the ramjet engine 6. In step 902, the airflow restriction mechanism 54 is actuated to restrict the inlet airflow 13 from flowing through the expansion turbine 60. In the FIG. 3 aspect, step 902 may be implemented by translating the translating spike 58 to engage with the converging/diverging inlet 56. In the FIG. 5 aspect, step 902 may be implemented by actuating the plurality of airflow inlet doors 84 to the closed position to restrict the inlet airflow 13 from flowing through the expansion turbine 60. In the FIG. 7 aspect, step 902 may be implemented by closing the turbine flow control doors 104 so as to restrict the airflow 13 from flowing through the expansion turbine 88.

In step 903, the inlet airflow 13 is provided to the intermediate inlet portion 62 by bypassing the expansion turbine 60. In the FIG. 3 aspect, step 903 may be implemented by actuating the intermediate inlet portion to be in the open state so as to provide an inlet airflow 68 therethrough to the compressor section 21 of the turbine engine 10. For example, as was described above, the expansion turbine bypass doors 66 may be actuated to the open state to allow the inlet airflow 68 to be provided to the fan assembly 14, and thereby to the compressor section 21. In the FIG. 5 aspect, the inlet airflow 13 may be provided to the intermediate inlet portion 62 by actuating the plurality of airflow inlet doors 84 to the closed position. In the FIG. 7 aspect, the inlet airflow 13 may be provided to the intermediate inlet portion 62 by translating the translating spike 94 toward the downstream end 36 to open the central inlet opening 92.

In step 904, the turbine engine 10 is operated to provide propulsion. The operation of the turbine engine 10 in the first operating state is described above and that description is incorporated herein and is not repeated.

In step 905, a transitional operating state may be implemented. As was described above, once a predetermined flight speed has been reached (e.g., between Mach 1.0 and Mach 2.5), the ramjet engine 6 may be made operational in the first operating state, along with the turbine engine 10. Thus, in the transitional operating state, the configuration of the propulsion system 4 may be as described above for the first operational state, but the ramjet engine 6 may be initiated to inject fuel into the ramjet combustor 8 so that the ramjet engine 6 also provides propulsion. The transitional operating state may be implemented up to a predetermined flight speed (e.g., up to Mach 2.5) before the second operating state is initiated.

In step 906, the propulsion system 4 is operated at the second operating state (e.g., a high speed operating state for a flight speed of greater than Mach 2.5). In step 907, the inlet airflow 78 is continued to be provided through the ramjet inlet portion 7 to the ramjet engine 6. In step 908, the airflow restriction mechanism 54 is actuated to permit the inlet airflow 78 to flow therethrough to the expansion turbine 60 (88), and, in step 909, the inlet airflow 13 is restricted from bypassing the expansion turbine 60 (88). In the FIG. 4 aspect, step 908 and step 909 may be implemented by translating the translating spike 58 toward the downstream end 36 to allow the inlet airflow 13 to pass through the converging/diverging inlet 56 and to flow to the expansion turbine 60, and by actuating the expansion turbine bypass doors 66 to be in the closed position. In the FIG. 6 aspect, step 908 and step 909 may be implemented by actuating the plurality of airflow inlet doors 84 to the open position so as to allow the inlet airflow 78 to flow to the expansion turbine 60 and to restrict the airflow 13 from bypassing the expansion turbine 60. In the FIG. 8 aspect, step 908 and step 909 may be implemented by translating the translating spike 94 toward the upstream end 36 so as to engage with the central inlet opening 92, thereby restricting the inlet airflow 78 from passing therethrough, and actuating the turbine flow control doors 104 to the open state to allow the inlet airflow 78 to pass through the expansion turbine 88.

In step 910, the expansion turbine 60 (88) is operated to expand and to cool the inlet airflow 78 to generate a reduced temperature (cooled) airflow 80 within the intermediate inlet portion 62. That is, the expansion turbine 60 may be designed to provide a particular amount of cooling to the inlet airflow 78 so that the reduced temperature (cooled) airflow 80 to be provided to the fan assembly 14 reaches an acceptable level for inlet airflow to the turbine engine 10. As was discussed above with regard to FIG. 6, the thermal management system 87 may be implemented to provide further cooling to the inlet airflow 78 so that the thermal parameters for the reduced temperature airflow 80 can better be met. In step 911, the reduced temperature airflow 80 is provided through the intermediate inlet portion 62 to the compressor section 21 (via the fan assembly 14) of the turbine engine 10. In step 912, the turbine engine 10 is continued to be operated, and in step 913, the ramjet engine 6 is also operated in conjunction with the turbine engine 10 to provide propulsion.

Further aspects of the present disclosure are provided by the subject matter of the following clauses.

A propulsion system comprises a turbine engine including a compressor section, a combustor, and a turbine section, a ramjet engine, an inlet section including a turbine engine inlet portion and a ramjet inlet portion, the inlet section providing an inlet airflow to the turbine engine and to the ramjet engine, the turbine engine inlet portion including an expansion turbine arranged upstream of the compressor section.

The propulsion system according to the preceding clause, the ramjet engine being arranged in parallel with the turbine engine.

The propulsion system according to any preceding clause, further comprising a thermal management system providing a cooling airflow from the compressor section to the expansion turbine.

The propulsion system according to any preceding clause, the turbine engine being one of a turbofan engine or a turbojet engine, and the ramjet engine being one of a ramjet engine or a scramjet engine.

The propulsion system according to any preceding clause, the turbine engine inlet portion further including an airflow restriction mechanism that is actuated, in a first operating state of the propulsion system, to restrict an inlet airflow therethrough to the expansion turbine, and is actuated, in a second operating state of the propulsion system, to permit the inlet airflow therethrough to the expansion turbine.

The propulsion system according to any preceding clause, wherein the airflow restriction mechanism includes a plurality of inlet airflow control doors arranged upstream of the expansion turbine and are actuated to restrict the inlet airflow through the expansion turbine in the first operating state, and are actuated to permit the inlet airflow through the expansion turbine in the second operating state.

The propulsion system according to any preceding clause, wherein the plurality of inlet airflow control doors are arranged circumferentially about a centerline axis of the propulsion system and are actuated circumferentially to restrict or permit the inlet airflow to the expansion turbine.

The propulsion system according to any preceding clause, the expansion turbine including a tip fan arranged to provide an inlet airflow therethrough to the ramjet inlet portion in the second operating state of the propulsion system.

The propulsion system according to any preceding clause, the airflow restriction mechanism comprising a translating spike, and the turbine engine inlet portion includes a converging/diverging inlet.

The propulsion system according to any preceding clause, the airflow restriction mechanism comprising a plurality of doors.

The propulsion system according to any preceding clause, the turbine engine inlet portion further including an intermediate inlet portion arranged between the expansion turbine and an inlet to the compressor section, the intermediate inlet portion being actuated to an open state in the first operating state of the propulsion system so as to provide an inlet airflow therethrough to the compressor section and to bypass the expansion turbine, and being actuated to a closed state in the second operating state of the propulsion system so as to provide an inlet airflow through the expansion turbine to the compressor section.

The propulsion system according to any preceding clause, wherein the intermediate inlet portion includes a plurality of doors that are actuated to the open state in the first operating state and are actuated to the closed state in the second operating state.

The propulsion system according to any preceding clause, the turbine engine further including a fan assembly arranged upstream of the compressor section, and a coupling drive shaft mechanism arranged to couple the fan assembly and the expansion turbine to each other in the second operating state of the propulsion system, and to decouple the fan assembly and the expansion turbine from each other in the first operating state of the propulsion system.

The propulsion system according to any preceding clause, the compressor section including a low pressure compressor and the turbine section includes a low pressure turbine coupled with the low pressure compressor to define a low pressure spool, the fan assembly is drivingly coupled to the low pressure spool, and, in the second operating state of the propulsion system, the expansion turbine provides a driving force to the low pressure spool.

The propulsion system according to any preceding clause, the first operating state being a state of operating the turbine engine to provide propulsion and providing a bypass airflow through the ramjet engine, and the second operating state is a state of operating the ramjet engine to provide propulsion and operating the turbine engine with the expansion turbine providing a cooled inlet airflow to the intermediate inlet portion and providing the driving force to the low pressure spool.

The propulsion system according to any preceding clause, the first operating state providing an airspeed of a flight vehicle of up to approximately Mach 2.5, and the second operating state provides an airspeed of the flight vehicle from approximately Mach 2.5 to approximately Mach 5.0.

A method of operating a propulsion system, the propulsion system including (a) a turbine engine including a compressor section, a combustor, and a turbine section, (b) a ramjet engine, and (c) an inlet section including a turbine engine inlet portion and a ramjet inlet portion, the inlet section providing an inlet airflow to the turbine engine and to the ramjet engine, the turbine engine inlet portion including (1) an expansion turbine arranged upstream of the compressor section, and (2) an airflow restriction mechanism for restricting/permitting an inlet airflow therethrough to the expansion turbine, and (3) an intermediate inlet portion arranged between the expansion turbine and an inlet to the compressor section, the intermediate inlet portion being actuated between an open state and a closed state, the method comprising operating the propulsion system in a first operating state by (i) providing an inlet airflow through the ramjet inlet portion so as to provide a bypass airflow through the ramjet engine, (ii) actuating the airflow restriction mechanism to restrict the inlet airflow from flowing through the expansion turbine, (iii) providing an inlet airflow through the intermediate inlet portion to the compressor section of the turbine engine, and (iv) operating the turbine engine to provide propulsion, and operating the propulsion system in a second operating state by (v) providing the inlet airflow through the ramjet inlet portion to the ramjet engine, (vi) actuating the airflow restriction mechanism to permit the inlet airflow to flow therethrough to the expansion turbine, (vii) restricting the inlet airflow from bypassing the expansion turbine and flowing into the intermediate inlet portion, (viii) operating the expansion turbine to expand and to cool the inlet airflow to generate a reduced temperature inlet airflow within the intermediate inlet portion, (ix) providing the reduced temperature inlet airflow through the intermediate inlet portion to the compressor section of the turbine engine, (x) and operating the turbine engine and the ramjet engine to provide propulsion.

The method according to any preceding clause, the airflow restriction mechanism comprising a spike mechanism, and the turbine engine inlet portion includes a converging/diverging inlet, and, in the first operating state, the actuating of the restriction airflow mechanism comprises translating the spike mechanism to engage with the converging/diverging inlet, and, in the second operating state, the actuating of the restriction airflow mechanism comprises translating the spike mechanism to disengage from the converging/diverging inlet.

The method according to any preceding clause, the turbine engine being one of a turbofan engine or a turbojet engine, and the ramjet engine is one of a ramjet engine or a scramjet engine.

The method according to any preceding clause, the turbine engine further including a fan assembly arranged upstream of the compressor section, and a coupling drive shaft mechanism arranged to couple the fan assembly and the expansion turbine to each other, and to decouple the fan assembly and the expansion turbine from each other, the method further comprising, in the first operating state, decoupling the expansion turbine from the fan assembly, and, in the second operating state, coupling the expansion turbine to the fan assembly via the coupling drive shaft mechanism.

The method according to any preceding clause, the compressor section including a low pressure compressor and the turbine section includes a low pressure turbine drivingly coupled to the low pressure compressor so as to define a low pressure spool, the method comprising, in the second operating state, the expansion turbine driving the low pressure spool.

The method according to any preceding clause, the expansion turbine including a tip fan arranged to provide an inlet airflow to the ramjet engine, and the method further comprises, in the second operating state, the operating the expansion turbine further operates the tip fan so as to provide a booster inlet airflow to the ramjet engine.

The method according to any preceding clause, the first operating state being a state of operating the turbine engine to provide propulsion and providing a bypass airflow through the ramjet engine, and the second operating state is a state of operating the ramjet engine to provide propulsion and operating the turbine engine with the expansion turbine providing a reduced temperature inlet airflow to the intermediate inlet portion and providing a driving force to the low pressure spool.

The method according to any preceding clause, further including operating the propulsion system in a transitional state between operating the propulsion system in the first operating state and operating the propulsion system in the second operating state.

The method according to any preceding clause, wherein the transitional operating state is initiated once a predetermined flight speed has been reached.

The method according to any preceding clause, wherein, in the transitional operating state, the ramjet engine is made operational in the first operating state, along with the turbine engine, so that both the turbine engine and the ramjet engine provide propulsion.

Although the foregoing description is directed to some exemplary embodiments of the present disclosure, other variations and modifications will be apparent to those skilled in the art, and may be made without departing from the spirit or the scope of the disclosure. Moreover, features described in connection with one embodiment of the present disclosure may be used in conjunction with other embodiments, even if not explicitly stated above.

We claim:
1. A propulsion system comprising:
 a turbine engine including a compressor section, a combustor, and a turbine section;
 a ramjet engine;

an inlet section including a turbine engine inlet portion and a ramjet inlet portion, the inlet section providing an inlet airflow to the turbine engine and to the ramjet engine, wherein the turbine engine inlet portion includes a converging/diverging inlet having a throat portion, the converging/diverging inlet converges from a forward end of the converging/diverging inlet to the throat portion and then diverges from the throat portion to an aft end of the converging/diverging inlet;

an expansion turbine arranged in the turbine engine inlet portion upstream of the turbine engine; and a translating spike disposed within the turbine engine inlet portion upstream of the expansion turbine, wherein the translating spike engages the throat portion of the converging/diverging inlet, in a first operating state of the propulsion system, to restrict the inlet airflow to the expansion turbine such that the inlet airflow bypasses the expansion turbine, and the translating spike disengages the throat portion of the converging/diverging inlet, in a second operating state of the propulsion system, and to permit the inlet airflow through the expansion turbine to the turbine engine.

2. The propulsion system according to claim 1, wherein the ramjet engine is arranged in parallel with the turbine engine.

3. The propulsion system according to claim 1, wherein the turbine engine is one of a turbofan engine or a turbojet engine.

4. The propulsion system according to claim 1, wherein the turbine engine inlet portion further includes an intermediate inlet portion arranged between the expansion turbine and an inlet to the compressor section, the intermediate inlet portion being actuated to an open state in the first operating state of the propulsion system so as to provide the inlet airflow therethrough to the turbine engine and to bypass the expansion turbine, and being actuated to a closed state in the second operating state of the propulsion system so as to provide the inlet airflow through the expansion turbine to the turbine engine.

5. The propulsion system according to claim 4, wherein the intermediate inlet portion includes a plurality of expansion turbine bypass doors, in the first operating state, the plurality of expansion turbine bypass doors are actuated to the open state such that the inlet airflow flows through the plurality of expansion turbine bypass doors to the turbine engine, and in the second operating state, the plurality of expansion turbine bypass door are actuated to the closed state such that the inlet airflow is prevented from flowing through the plurality of expansion turbine bypass doors to the turbine engine.

6. The propulsion system according to claim 4, wherein the turbine engine further includes a fan assembly arranged upstream of the compressor section, and a coupling drive shaft mechanism arranged to couple the fan assembly and the expansion turbine to each other in the second operating state of the propulsion system, and to decouple the fan assembly and the expansion turbine from each other in the first operating state of the propulsion system.

7. The propulsion system according to claim 6, wherein the compressor section includes a low pressure compressor and the turbine section includes a low pressure turbine coupled with the low pressure compressor to define a low pressure spool, the fan assembly is drivingly coupled to the low pressure spool, and, in the second operating state of the propulsion system, the expansion turbine provides a driving force to the low pressure spool.

8. The propulsion system according to claim 7, wherein the first operating state is a state of operating the turbine engine to provide turbine engine propulsion and providing a bypass airflow through the ramjet engine, and the second operating state is a state of operating the ramjet engine to provide ramjet engine propulsion and operating the turbine engine with the expansion turbine providing a cooled inlet airflow to the intermediate inlet portion and providing the driving force to the low pressure spool.

9. The propulsion system according to claim 8, wherein the first operating state provides an airspeed of a flight vehicle of up to approximately Mach 2.5, and the second operating state provides an airspeed of the flight vehicle from approximately Mach 2.5 to approximately Mach 5.0.

10. The propulsion system according to claim 1, wherein the propulsion system defines an upstream end and a downstream end, and the translating spike translates toward the upstream end in the first operating state to restrict the inlet airflow to the expansion turbine, and the translating spike translates toward the downstream end in the second operating state to permit the inlet airflow through the expansion turbine to the turbine engine.

11. A method of operating a propulsion system, the propulsion system including (a) a turbine engine including a compressor section, a combustor, and a turbine section, (b) a ramjet engine, and (c) an inlet section including a turbine engine inlet portion and a ramjet inlet portion, the inlet section providing an inlet airflow to the turbine engine and to the ramjet engine, the turbine engine inlet portion including (1) a converging/diverging inlet having a throat portion, the converging/diverging inlet converges from a forward end of the converging/diverging inlet to the throat portion and then diverges from the throat portion to an aft end of the converging/diverging inlet, (2) an expansion turbine arranged upstream of the turbine engine, (3) a translating spike disposed within the turbine engine inlet portion upstream of the expansion turbine, and (4) an intermediate inlet portion arranged between the expansion turbine and an inlet to the turbine engine, the intermediate inlet portion being actuated between an open state and a closed state, the method comprising:

operating the propulsion system in a first operating state by (i) providing the inlet airflow through the ramjet inlet portion so as to provide a bypass airflow through the ramjet engine, (ii) actuating the translating spike to engage the throat portion of the converging/diverging inlet to restrict the inlet airflow from flowing through the expansion turbine such that the inlet airflow bypasses the expansion turbine, (iii) providing the inlet airflow through the intermediate inlet portion to the turbine engine, and (iv) operating the turbine engine to provide turbine engine propulsion; and operating the propulsion system in a second operating state by (v) providing the inlet airflow through the ramjet inlet portion to the ramjet engine, (vi) actuating the translating spike to disengage the throat portion of the converging/diverging inlet to permit the inlet airflow to flow through the expansion turbine to the turbine engine, (vii) restricting the inlet airflow from bypassing the expansion turbine and flowing into the intermediate inlet portion, (viii) operating the expansion turbine to expand and to cool the inlet airflow to generate a reduced temperature inlet airflow within the intermediate inlet portion, (ix) providing the reduced temperature inlet airflow through the intermediate inlet portion to the turbine engine, (x) and operating the turbine engine and the ramjet engine to provide ramjet engine propulsion.

12. The method according to claim 11, wherein the turbine engine is one of a turbofan engine or a turbojet engine.

13. The method according to claim 11, wherein the turbine engine further includes a fan assembly arranged upstream of the compressor section, and a coupling drive shaft mechanism arranged to couple the fan assembly and the expansion turbine to each other, and to decouple the fan assembly and the expansion turbine from each other, the method further comprising, in the first operating state, decoupling the expansion turbine from the fan assembly, and, in the second operating state, coupling the expansion turbine to the fan assembly via the coupling drive shaft mechanism.

14. The method according to claim 13, wherein the compressor section includes a low pressure compressor and the turbine section includes a low pressure turbine drivingly coupled to the low pressure compressor so as to define a low pressure spool, the method comprising, in the second operating state, the expansion turbine driving the low pressure spool.

15. The method according to claim 14, wherein the first operating state is a state of operating the turbine engine to provide the turbine engine propulsion and providing the bypass airflow through the ramjet engine, and the second operating state is a state of operating the ramjet engine to provide the ramjet engine propulsion and operating the turbine engine with the expansion turbine providing the reduced temperature inlet airflow to the intermediate inlet portion and providing a driving force to the low pressure spool.

* * * * *